United States Patent [19]

Amonson

[11] Patent Number: 5,524,682

[45] Date of Patent: Jun. 11, 1996

[54] METHOD AND APPARATUS FOR FILLING A TANK WITH A PREDETERMINED WEIGHT OF LIQUID

[76] Inventor: Alan Amonson, Box 597, Charlie Lake, British Columbia, Canada, V0C 1H0

[21] Appl. No.: 290,526

[22] Filed: Aug. 15, 1994

[51] Int. Cl.$^6$ .................. B65B 1/30; B65B 31/00
[52] U.S. Cl. .................. 141/95; 141/83; 141/198; 73/299
[58] Field of Search .................. 141/1, 83, 95, 141/198; 73/298, 299, 301; 128/200.11

[56] References Cited

U.S. PATENT DOCUMENTS

| | | | |
|---|---|---|---|
| 3,373,609 | 3/1968 | Sundby | 73/299 |
| 4,630,478 | 12/1986 | Johnson | 73/299 |
| 4,669,309 | 6/1987 | Cornelius | 73/301 |
| 4,805,672 | 2/1989 | Berrettini | 141/95 |
| 5,146,783 | 9/1992 | Jansche et al. | 73/301 |
| 5,163,324 | 11/1992 | Stewart | 73/301 |

*Primary Examiner*—Henry J. Recla
*Assistant Examiner*—Steven O. Douglas
*Attorney, Agent, or Firm*—Antony R. Lambert

[57] ABSTRACT

A method for filling a tank with a predetermined weight of liquid is described. This method is useful wherever floats or other volumetric dependent modes of measurement do not yield the desired information. Firstly, calculate the pressure differential required to overcome internal tank pressure and force a non-turbulent stream of bubbles from a bottom of a tank when the tank is filled with a known predetermined weight of liquid, thereby setting a standard for comparison purposes. Secondly, monitor the pressure differential required to overcome internal tank pressure and force a non-turbulent stream of bubbles from a bottom of the tank as a flow of liquid is entering the tank.

11 Claims, 2 Drawing Sheets

5,524,682

METHOD AND APPARATUS FOR FILLING A TANK WITH A PREDETERMINED WEIGHT OF LIQUID

The present invention relates to a method and apparatus for filling a tank with a predetermined weight of liquid.

BACKGROUND OF THE INVENTION

Most apparatus for determining liquid levels in tanks use floatation devices. These floatation devices accurately gauge volume but do not accurately gauge the weight of the fluid. One reason is that volume varies with temperature. Another reason is that it is only possible to equate a volume of liquid to its weight if the liquid is homogeneous.

For example, oil is treated at high temperatures and then pumped into storage tanks. Gauges that rely upon floatation devices will give one reading for the oil when it first flows into the tank after undergoing the heat treatment and a different reading after the oil has sat in the tank and had the opportunity to cool. Knowing the number of gallons of oil is not sufficient to provide an indication of weight unless there is additional information provided regarding the grade of oil. Light oil weighs approximately 6.8 pounds per gallon. Heavier oil may weigh in excess of 8.66 pounds per gallon. This has particular application for continuous flow treatment processes. With such processes, stopping to allow the oil to cool is disruptive to the process. As soon as the tank is filled to a predetermined level, a valve controlling flow into the tank is closed and a valve controlling flow out of the tank is opened to allow the contents of the tank to be pumped out.

Another example relates to the transportation of crude oil. In order to prevent overloaded transport vehicles from damaging public highways, every jurisdiction has highway load limits. Crude oil generally consists of a mixture of water and oil, the proportions of which frequently vary. In the absence of information regarding the composition of the crude oil, it is difficult, if not impossible, for the operator to accurately determine the amount of crude oil that can be transported while still staying within legal load limits.

SUMMARY OF THE INVENTION

What is required is a method and apparatus for filling a tank with a predetermined weight of liquid.

According to one aspect of the present invention there is provided a method for filling a tank with a predetermined weight of liquid. Firstly, calculate the pressure differential required to overcome internal tank pressure and force a non-turbulent stream of bubbles from a bottom of a tank when the tank is filled with a known predetermined weight of liquid, thereby setting a standard for comparison purposes. Secondly, monitor the pressure differential required to overcome internal tank pressure and force a non-turbulent stream of bubbles from a bottom of the tank as a flow of liquid is entering the tank.

With the method, as described above, the pressure differential reading is gauged against a known standard. The known standard can be arrived at through either experimentation of through elaborate engineering calculations. The force required to send a non-turbulent stream of bubbles through the liquid will, of course, be dependent upon the weight of the overlying column of liquid. When a single target standard is used, such as highway load limits or tank dump for a flow through oil process, the flow of liquid into the tank is terminated when the pressure differential approaches the predetermined standard. When there is no single target, scaling electronics can be added that convert data regarding pressure differential into weight readings.

According to another aspect of the present invention there is provided an apparatus for filling a tank with a predetermined weight of liquid which includes a tank having an interior cavity with a bottom, a top and sidewalls, the tank having a vent to atmosphere. A bubble tube having a first end and a second end. The first end is positioned within the interior cavity of the tank adjacent the bottom. A source of air pressurized at a constant pressure is connected to the second end of the tube, whereby a non-turbulent stream of bubbles is sent through the interior cavity from the second end of the bubble tube. Means is provided for monitoring and converting into an electrical signal the pressure differential between the pressure provided by the source of pressurized air and the internal tank pressure. Means is provided for converting the electrical signal into human readable form.

The preferred means for monitoring and converting into an electrical signal the pressure differential between the pressure provided by the source of pressurized air and the internal tank pressure includes a differential pressure transducer having a first air inlet and a second air inlet. A first pressure monitoring tube extends from the bubble tube to the first air inlet of the differential pressure transducer. A second pressure monitoring tube extends from the interior cavity of the tank to the second air inlet of the differential pressure transducer. The pressure differential between the first air inlet and the second air inlet is converted by the differential pressure transducer into an electrical signal. The preferred means for converting the electrical signal into human readable form is a digital voltage meter coupled to the differential pressure transducer.

Most tanks have an automatic shut off mechanism that stops the tank from being filling to point of overflowing. There are a variety of shut off mechanisms available. It is undesirable to place any electrical switch mechanism into a potentially explosive environment, such as a tank containing petroleum products in which hydrogen sulfide gas may be present. It is, therefore, preferred that the means to terminate the flow of liquids into the tank when height of liquids within the tank reaches a predetermined level include a maximum level tube having an inlet spaced from the top of the tank. A differential pressure transducer is provided having a first air inlet and a second air inlet. A first pressure monitoring tube extends from the maximum level tube to the first air inlet of the differential pressure transducer. A second pressure monitoring tube extends from the interior cavity of the tank to the second air inlet of the differential pressure transducer. The pressure differential between the first air inlet and the second air inlet is converted by the differential pressure transducer into an electrical signal. An electrically operated flow valve is provided that moves to a closed position terminating the flow of liquids into the tank upon receiving the electrical signal from the differential pressure transducer.

Although beneficial results may be obtained through the use of the apparatus for filling a tank with a predetermined weight of liquid, as described above, special considerations apply when the tank is mounted on a transport vehicle. Even more beneficial results may be obtained in such installations when the source of pressurized air is tapped from the air brakes of the transport vehicle. The air brakes of a transport vehicle typically have between 90 and 110 pounds per square inch of pressure. This pressure is too great and would produce turbulence within the tank. It is, therefore, preferred that the pressurized air be passed through two air regulators prior to connection with the second end of the bubble tube. The air regulators provide a two stage air pressure reduction that reduces pressure down to a more controllable level which will not produce turbulence but will produce a stream of bubbles. The pressure level chosen must be constant and will depend upon the pressures that are expected build within the tank which must be overcome to send a stream of bubbles through the liquid.

Although beneficial results may be obtained through the use of the apparatus, as described above, pushing a volume of air a distance through a tube invariably leads to turbulence being generated. Even more beneficial results may, therefore, be obtained when the pressurized air is passed through an internal feed tube that extends to the first end of the bubble tube. This reduces both the volume of air required and turbulence produced.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
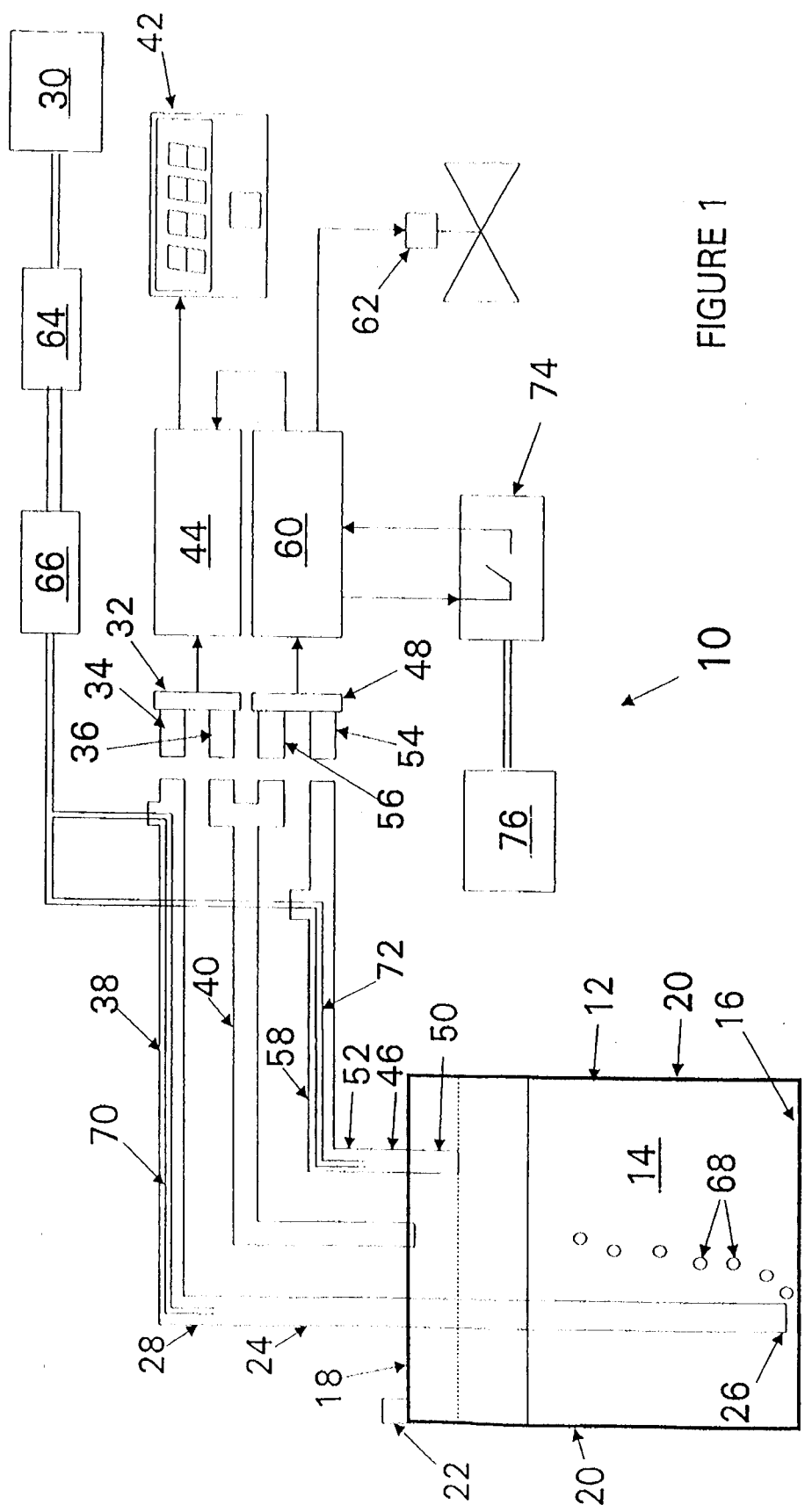
FIG. 1 is schematic representation of an apparatus constructed in accordance with the teachings of the present invention.

The preferred embodiment, an apparatus for filling a tank with a predetermined weight of liquid generally identified by reference numeral 10, will now be described with reference to FIG. 1 and FIG. 2.

Apparatus 10 consist of a tank 12 having an interior cavity 14 with a bottom 16, a top 18 and sidewalls 20. Interior cavity 14 of tank 12 is vented through a vent 22 to atmosphere or to a gas scrubber. A bubble tube 24 extends from top 18 into interior cavity 14. Bubble tube 24 has a first end 26 and a second end 28. First end 26 is positioned within interior cavity 14 of tank 12 adjacent bottom 16. A source of pressurized air 30 provides air at a constant pressure to second end 28 of bubble tube 24. A first differential pressure transducer 32 is used as means for monitoring and converting into an electrical signal a pressure differential between the pressure at second end 28 of bubble tube 24 and internal tank pressure. First differential pressure transducer 32 has a first air inlet 34 and a second air inlet 36. A first pressure monitoring tube 38 extends from bubble tube 24 to first air inlet 34 of first differential pressure transducer 32. A second pressure monitoring tube 40 extends from interior cavity 14 of tank 12 to second air inlet 36 of first differential pressure transducer 32, thereby providing a reference pressure. A pressure differential between first air inlet 34 and second air inlet 36 is converted by first differential pressure transducer 32 into an electrical signal, as will hereinafter be further described. A digital meter 42 is either directly or indirectly coupled to first differential pressure transducer 32 whereby the electrical signal of first differential pressure transducer 32 is converted into human readable form. The reading of digital meter 42 can be left as a pressure differential reading, or can be converted through a scaling electronics module 44 into a weight reading. A maximum level tube 46 and a second differential pressure transducer 48 form means to terminate the flow of liquids into tank 12 when the height of liquids within tank 12 reaches a predetermined level. Maximum level tube 46 depends from top 18 of tank 12 and has a first end 50 and a second end 52. First end 50 forms an inlet spaced from top 18 of tank 12. Second end 52 is indirectly connected to the source of pressurized air 30. Second differential pressure transducer 48 has a first air inlet 54 and a second air inlet 56. A first pressure monitoring tube 58 extends from maximum level tube 46 to first air inlet 54 of second differential pressure transducer 48. Second pressure monitoring tube 40 extends from interior cavity 14 of tank 12 to second air inlet 56 of second differential pressure transducer 48. The pressure differential between first air inlet 54 and second air inlet 56 is converted by second differential pressure transducer 48 into an electrical signal to a high level detection electronics module 60. An electrically operated flow valve 62 coupled with high level detection electronics module 60 and second differential pressure transducer 48, and moves to a closed position terminating the flow of liquids into tank 12 upon receiving the electrical signal from second differential pressure transducer 48 via high level detection electronics module 60.

Figure 2:
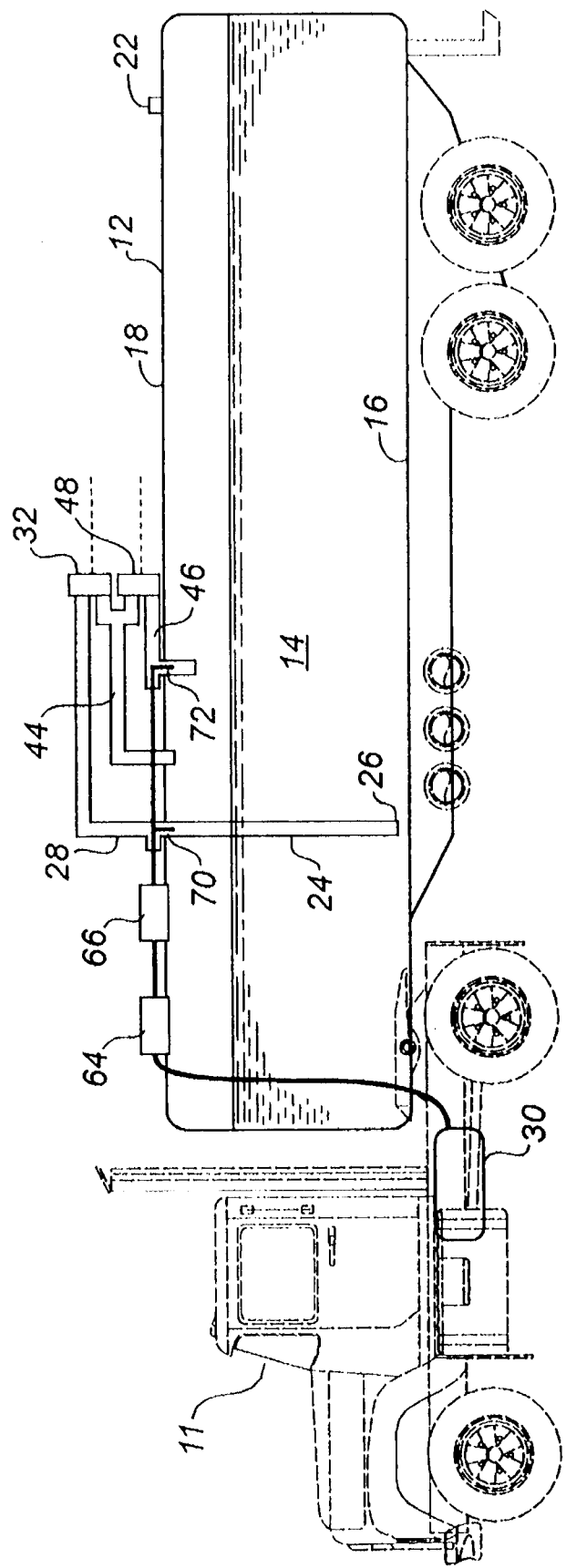
FIG. 2 is a side elevation view of the apparatus illustrated in FIG. 1, mounted on a transport vehicle.

When tank 12 is mounted on a transport vehicle 11, as illustrated in FIG. 2 it is advantageous to have source of pressurized air 30 taken from the air brakes of the transport vehicle. This results in some further features being added to the system, as illustrated in FIG. 1. The air brakes for the transport vehicle run on between 90 and 110 pounds per square inch of air pressure. In order to make this air suitable for use in apparatus 10, pressurized air is passed through two air regulators, a first air regulator 64 and a second air regulator 66, prior to connection with second end 28 of bubble tube 24 and second end 52 of maximum level tube 46. Air regulators 64 and 66 provide a two stage air pressure reduction. First air regulator 64 substantially reduces the air pressure, but is not capable of completely removing all pressure fluctuations. Second air regulator 66 precisely regulates the air pressure to a selected constant pressure level. The selected pressure level will depend upon the pressure requirements to generate a stream of bubbles, generally indicated by reference numeral 68. It is undesirable to have a turbulent flow so it is preferred that measures be taken to cut down on turbulence. Beneficial results have been obtained in proto-type testing at pressures of between 3.5 and 10 pounds per square inch, although it is understood that greater pressures may be required for some applications. Both bubble tube 24 and maximum level tube 46 have internal feed tubes 70 and 72. Internal feed tubes 70 and 72 originate from second air regulator 66 and extend into bubble tube 24 and maximum level tube 46, respectively. This reduces both the volume of air required and the turbulence produced. If the air brake system is to be used as source of pressurized air 30, apparatus 10 can only operate when the air is not required to operate the brakes. As a safety feature an air activated switch 74 is provided. Air activated switch 74 turns on the system when a parking brake 76 on the transport vehicle is engaged.

The use and operation of apparatus 10 will now be described. There are two ways in which apparatus 10 may be used. When used on a transport vehicle the primary concern is that of highway load limits. There is, therefore, only a single weight that is of importance. Firstly, the pressure differential required to overcome internal pressure within interior cavity 14 and force a non-turbulent stream of bubbles 68 from bottom 16 of tank 12 when the tank is filled with a predetermined weight of liquid is calculated. This can be done through engineering calculations or through experimentation. This sets a standard for comparison purposes with subsequent loads. Secondly, the pressure differential required to overcome internal pressure within interior cavity 14 and force a non-turbulent stream of bubbles 68 from bottom 16 of tank 12 as a flow of liquid is entering tank 12 is monitored. A pressure reading can be reflected on digital meter 42, and compared to the standard pressure level that is known to be within highway load limits. The flow of liquid into tank 12 can then be terminated when the pressure differential approaches the predetermined standard pressure differential that reflects the highway load limit.

The system as illustrated in FIG. 1 is somewhat more elaborate. A pressure differential is created between first air inlet 34 and second air inlet 36 of first pressure differential transducer 32. This differential reflects a difference between pressure within interior cavity 14 and the additional pressure required to send stream of bubbles 68 through bubble tube 24. The differential in pressure is received by scaling electronics module 44 which translates the pressure differential to a weight, which is then displayed on digital display module 42. In this case there is no one pressure standard, as scaling electronics module 44 is capable of converting any pressure differential into a weight reading. Should the operator not manually terminate the flow into tank 12, valve 62 will eventually terminate such flow upon receiving an electric signal. The electric signal is produced through second pressure differential transducer 48. Second pressure differential transducer 48 detects a pressure differential between first air inlet 54 and second air inlet 56. This differential is communicated to maximum level detection electronics module 60, which sends a signal to valve 62 when the pressure differential reading indicates that liquid has reached first end 50 of maximum level tube 46.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. An apparatus for filling a tank with a predetermined weight of liquid, comprising in combinations:

a tank having an interior cavity with a bottom, a top and sidewalls, the tank being mounted on a transport vehicle;

a bubble tube having a first end and a second end, the first end being positioned within the interior cavity of the tank adjacent the bottom;

a source of air pressurized at a constant pressure being connected to the second end of the tube, whereby a non-turbulent stream of bubbles is sent through the interior cavity from the second end of the bubble tube, the source of pressurized air being tapped from an air supply of the transport vehicle;

means for monitoring and converting into an electrical signal the pressure differential between the pressure provided by the source of pressurized air and the internal tank pressure; and means for converting the electrical signal into human readable form indicative of the weight of liquid contained within the tank.

2. The apparatus for filling a tank with a predetermined weight of liquid as defined in claim 1, wherein the means for monitoring and converting into an electrical signal the pressure differential between the pressure provided by the source of pressurized air and the internal tank pressure includes:

a differential pressure transducer having a first air inlet and a second air inlet;

a first pressure monitoring tube extending from the bubble tube to the first air inlet of the differential pressure transducer;

a second pressure monitoring tube extending from the interior cavity of the tank to the second air inlet of the differential pressure transducer, such that the pressure differential between the first air inlet and the second air inlet is converted by the differential pressure transducer into an electrical signal.

3. The apparatus for filling a tank with a predetermined weight of liquid as defined in claim 2, wherein the means for converting the electrical signal into human readable form is a digital meter coupled to the differential pressure transducer.

4. The apparatus for filling a tank with a predetermined weight of liquid as defined in claim 1, wherein means is provided to terminate the flow of liquids into the tank when height of liquids within the tank reaches a predetermined level.

5. The apparatus for filling a tank with a predetermined weight of liquid as defined in claim 4, wherein the means includes:

a maximum level tube having an inlet spaced from the top of the tank;

a differential pressure transducer having a first air inlet and a second air inlet;

a first pressure monitoring tube extending from the maximum level tube to the first air inlet of the differential pressure transducer;

a second pressure monitoring tube extending from the interior cavity of the tank to the second air inlet of the differential pressure transducer, such that the pressure differential between the first air inlet and the second air inlet is converted by the differential pressure transducer into an electrical signal; and an electrically operated flow valve that moves to a closed position terminating the flow of liquids into the tank upon receiving the electrical signal from the differential pressure transducer.

6. The apparatus for filling a tank with a predetermined weight of liquid as defined in claim 1, wherein the pressurized air is passed through two air regulators prior to connection with the second end of the bubble tube, such that the air regulators provide a two stage air pressure reduction.

7. The apparatus for filling a tank with a predetermined weight of liquid as defined in claim 1, wherein the pressurized air is passed through an internal food tube that extends into the bubble tube, thereby reducing both the volume of air required and turbulence produced.

8. An apparatus for filling a tank with a predetermined weight of liquid, comprising in combination:

a. a tank having an interior cavity with a bottom, a top and sidewalls;

b. a bubble tube having a first end and a second end, the first end being positioned within the interior cavity of the tank adjacent the bottom;

c. a source of air pressurized at a constant pressure being connected to the second end of the tube, whereby a non-turbulent stream of bubbles is sent through the interior cavity from the second end of the bubble tube;

d. means for monitoring and converting into an electrical signal the pressure differential between the pressure provided by the source of pressurized air and the internal tank pressure, including:

a differential pressure transducer having a first air inlet and a second air inlet;

a first pressure monitoring tube extending from the bubble tube to the first air inlet of the differential pressure transducer;

a second pressure monitoring tube extending from the interior cavity of the tank to the second air inlet of the differential pressure transducer, such that the pressure differential between the first air inlet and the second air inlet is converted by the differential pressure transducer into an electrical signal;

e. a digital meter coupled to the differential pressure transducer whereby the electrical signal is converted into human readable form;

f. means to terminate the flow of liquids into the tank when height of liquids within the tank reaches a predetermined level, including:

a maximum level tube having an inlet spaced from the top of the tank;

a differential pressure transducer having a first air inlet and a second air inlet;

a first pressure monitoring tube extending from the maximum level tube to the first air inlet of the differential pressure transducer;

a second pressure monitoring tube extending from the interior cavity of the tank to the second air inlet of the differential pressure transducer, such that the pressure differential between the first air inlet and the second air inlet is converted by the differential pressure transducer into an electrical signal; and an electrically operated flow valve that moves to a closed position terminating the flow of liquids into the tank upon receiving the electrical signal from the differential pressure transducer.

9. The apparatus for filling a tank with a predetermined weight of liquid as defined in claim 8, wherein the tank is mounted on a transport vehicle and the source of pressurized air is tapped from the air supply of the transport vehicle.

10. The apparatus for filling a tank with a predetermined weight of liquid as defined in claim 9, wherein the pressurized air is passed through two air regulators prior to connection with the second end of the bubble tube, such that the air regulators provide a two stage air pressure reduction reducing the air pressure to a selected pressure level.

11. The apparatus for filling a tank with a predetermined weight of liquid as defined in claim 9, wherein the pressurized air is passed through an internal feed tube that extends into the bubble tube, thereby reducing both the volume of air required and turbulence produced.

\* \* \* \* \*